(12) United States Patent
Kan et al.

(10) Patent No.: US 7,863,935 B2
(45) Date of Patent: Jan. 4, 2011

(54) LINE DRIVER ARCHITECTURE FOR 10/100/1000 BASE-T ETHERNET

(75) Inventors: Meng-Ping Kan, Hsinchu (TW); Chin-Chun Lin, Kaohsiung (TW); Hsin-Hsien Li, Hsinchu (TW)

(73) Assignee: Trendchip Technologies Corporation, Jhudong Township, Hsinchu County (TW)

( * ) Notice: Subject to any disclaimer, the term of this patent is extended or adjusted under 35 U.S.C. 154(b) by 449 days.

(21) Appl. No.: 12/035,031

(22) Filed: Feb. 21, 2008

(65) Prior Publication Data

US 2009/0212829 A1 Aug. 27, 2009

(51) Int. Cl.
*H03K 19/094* (2006.01)
*H03K 19/0175* (2006.01)

(52) U.S. Cl. .............................. 326/86; 326/82; 326/83
(58) Field of Classification Search .................. None
See application file for complete search history.

(56) References Cited

U.S. PATENT DOCUMENTS

| | | | |
|---|---|---|---|
| 5,838,723 A | 11/1998 | Mack et al. | |
| 6,175,255 B1 | 1/2001 | Mohan | |
| 6,665,347 B2 * | 12/2003 | van Bavel et al. | 375/257 |
| 6,919,742 B1 | 7/2005 | McGlinchey | |
| 7,483,688 B2 * | 1/2009 | Huang et al. | 455/402 |

* cited by examiner

*Primary Examiner*—Anh Q Tran
(74) *Attorney, Agent, or Firm*—Finnegan, Henderson, Farabow, Garrett & Dunner LLP (57) ABSTRACT

A multimode line driver circuit is provided having improved performance. The multimode line driver comprises at least first and second driver circuits that, when "active," respectively transmit data using first and second modes. The multimode line driver further comprises a circuit arrangement including a voltage regulator and an associated set of switches. In operation, at least some of the switches are coupled to the second driver circuit and are turned on when the first driver circuit is active. The voltage regulator supplies a direct current to at least some of the turned-on switches in order to decrease a common mode voltage at the second driver circuit while the first driver circuit transmits data using the first mode. As such, components of the second driver circuit can be powered off while the first driver circuit is active, thus reducing power consumption in the first mode.

15 Claims, 10 Drawing Sheets

LINE DRIVER ARCHITECTURE FOR 10/100/1000 BASE-T ETHERNET

FIELD OF THE INVENTION

The disclosure relates to the field of line driver circuits and, more particularly, to a multimode Ethernet line driver architecture having improved performance for transmitting data using different Ethernet modes.

BACKGROUND

A network is a collection of interconnected nodes that exchange information. The network may be configured as a local-area network ("LAN") or wide-area network, such as the Internet. Each network node may be a computer or any other device that is configured to communicate with other nodes in the network. The network nodes typically communicate with one another by exchanging information in accordance with predetermined network communication protocols. In this context, a protocol is a set of rules defining how information is exchanged between network nodes.

Ethernet is a common network communication protocol used in LANs. The Ethernet protocol is set forth in the publicly-available Institute of Electrical and Electronics Engineers ("IEEE") Standard 802.3, entitled "Carrier Sense Multiple Access With Collision Detection (CSMA/CD) Access Method and Physical Layer Specifications," which is hereby incorporated by reference in its entirety. The IEEE Standard 802.3 describes data-packet formatting for creating Ethernet data packets, and further describes different combinations of baseband data rates (i.e., without frequency modulation) and physical media for transmitting Ethernet data packets between network nodes.

As used herein, an "Ethernet mode" corresponds to a particular combination of baseband data rate and physical transmission medium. The IEEE Standard 802.3 describes various Ethernet modes including, for example, 10BASE-T, 100BASE-TX ("Fast Ethernet"), and 1000BASE-T ("Gigabit Ethernet"). More specifically, 10BASE-T supports baseband Ethernet data transmissions up to 10 megabits per second ("Mbps") over twisted-pair cables. 100BASE-TX supports baseband transmissions up to 100 Mbps over twisted-pair cables; 1000BASE-T supports baseband transmissions up to 1 gigabit per second (1000 Mbps) over twisted-pair cables. While 10BASE-T, 100BASE-TX, and 1000BASE-T are popular Ethernet modes in modern LAN architectures, it will be apparent that other Ethernet modes are possible. Accordingly, the 10BASE-T, 100BASE-TX, and 1000BASE-T Ethernet modes are discussed throughout this disclosure by way of example and not limitation.

In practice, 10BASE-T and 100BASE-TX LAN connections are typically deployed over conventional "Category-5" cables having four pairs of unshielded twisted copper wires. 1000BASE-T connections typically use enhanced Category-5, or "Category-5e," cables. Both Category-5 and Category-5e cables have 100 ohm impedances and, thus, require 100 ohm terminations to prevent signal reflections. In this disclosure, the terms "Category-5 cable" and "CAT5 cable" generally refer to any cable that exhibits the electrical characteristics of a conventional Category-5 or Category-5e cable.

Figure 1:
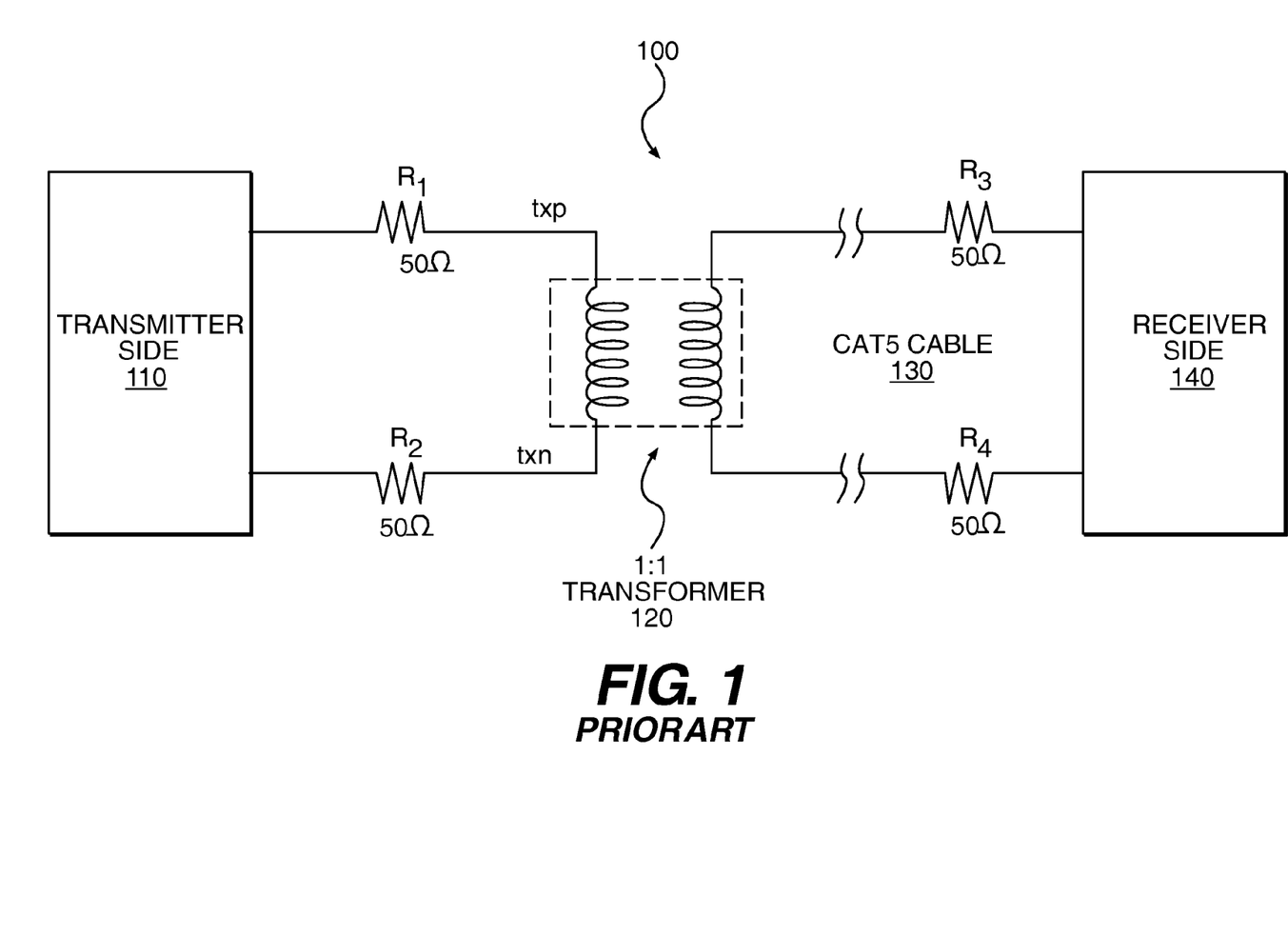
FIG. 1, previously described, is a schematic block diagram of an Ethernet connection known in the art.

Typically, a network node comprises a network interface card ("NIC") adapted to transmit and/or receive data. The NIC may contain hardware and software drivers for transmitting data using a selected Ethernet mode. To that end, the NIC may employ line driver circuitry to transmit and/or receive Ethernet data over a physical transmission medium, such as a Category-5 cable. FIG. 1 illustrates a schematic block diagram of an exemplary Ethernet connection (or "link") 100 having a transmitter side 110 and a receiver side 140 interconnected by a Category-5 cable 130. The transmitter side comprises line driver circuitry, e.g., located in a first NIC, configured to transmit Ethernet data over the cable 130 to the receiver side 140, e.g., located in a second NIC. The transmitter side 110 is electrically isolated from the cable 130 and the receiver side 140 by a transformer 120 having a one-to-one turns ratio. The transmitter side circuitry also includes a pair of 50 ohm resistors R1 and R2 that are impedance matched with effective 50 ohm resistances R3 and R4 in the Category-5 cable 130.

The exemplary line driver circuitry shown in FIG. 1 transmits Ethernet data as a differential output signal having a positive output voltage txp and a negative output voltage txn. The resulting Ethernet signal is therefore the difference of the positive and negative output voltages, i.e., txp−txn. In 10BASE-T Ethernet mode, the typical positive output voltage txp is greater than 2.2 volts peak-to-peak (Vpp) and the resulting differential output signal is therefore greater than 4.4 Vpp. In contrast, 100BASE-TX and 1000BASE-T modes employ significantly lower-amplitude signals, e.g., having a positive output voltage txp around 1 Vpp and a differential output signal around 2 Vpp. Although the 100BASE-TX and 1000BASE-T output signals have similar peak-to-peak voltage swings, the IEEE Standard 802.3 specifies that the 1000BASE-T output signal, unlike the 100BASE-TX signal, is encoded using five-level pulse-amplitude modulation for better bandwidth utilization.

It is often desirable for a NIC to be capable of transmitting data using more than one Ethernet mode. For example, the NIC may be located in a device that is initially configured to communicate over a 10BASE-T Ethernet link, but subsequently may be connected to a faster 100BASE-TX link. In this example, the line driver circuitry in the NIC must be capable of transmitting both 10BASE-T and 100BASE-TX Ethernet signals. By way of example, FIG. 2 illustrates one possible implementation of a prior art multimode Ethernet line driver circuit that can be configured for either 10BASE-T or 100BASE-TX operations.

Figure 2:
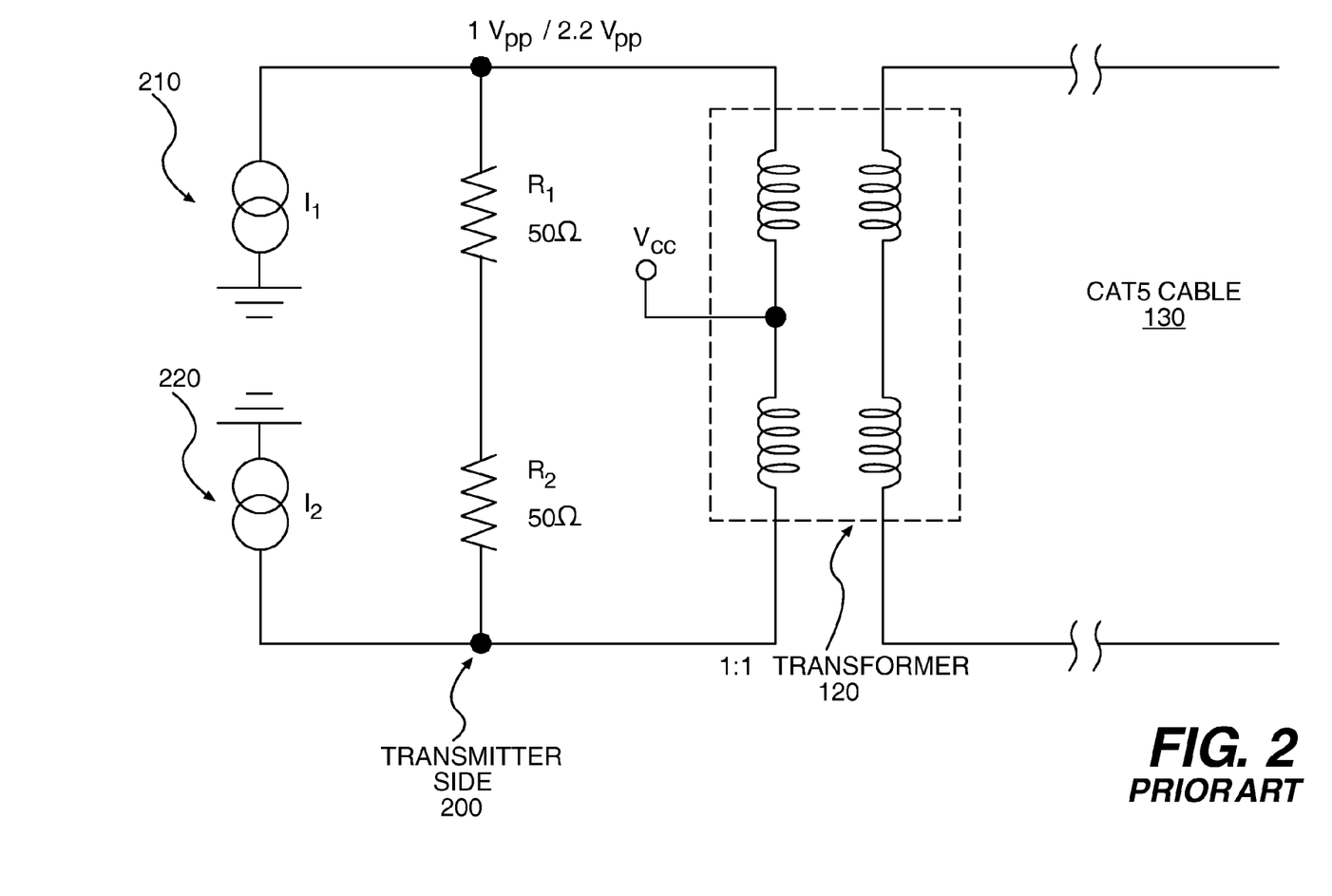
FIG. 2, previously described, is an exemplary prior-art multimode Ethernet line driver circuit that can be configured for either 10BASE-T or 100BASE-TX operations.

As shown in FIG. 2, an exemplary transmitter side 200 comprises an Ethernet line driver circuit including a pair of current sources 210 and 220. The current sources alternatively could be replaced with voltage sources (not shown). The line driver also includes a pair of 50 ohm resistors R1 and R2 that are impedance matched with the Category-5 cable 130. The current sources 210 and 220 output respective currents I1 and I2 for generating a differential Ethernet signal through the transformer 120. The transformer is center-tapped and has its center tap connected to a constant supply voltage Vcc. The supply voltage Vcc therefore sets the common-mode voltage of the Ethernet signal. As used herein, a "common mode voltage" is a constant voltage offset on which an alternating-current ("AC") signal may be modulated.

To effectively convert between 10BASE-T and 100BASE-TX modes of operation using the multimode line driver of FIG. 2, the current sources 210 and 220 must be able to generate different output signal amplitudes. Specifically, and as noted above, each of the current sources 210 and 220 must generate 2.2 Vpp output signals for 10BASE-T operations, whereas the current sources only need to generate 1 Vpp output signals for 100BASE-TX (or 1000BASE-T) operations.

Although the multimode Ethernet driver shown in FIG. 2 is feasible, it suffers significant disadvantages. Most notably, the power efficiency of the line driver circuit is directly related to the ratio of its output driver voltage swing to its supply voltage. Therefore, since the required voltage swing (e.g., 1 Vpp) in 100BASE-TX mode is much less than the required voltage swing (e.g., 2.2 Vpp) in 10BASE-T mode, using a fixed supply voltage Vcc for both Ethernet modes generally results in poor power efficiency in the 100BASE-TX mode. More generally, in order for the multimode Ethernet line driver of FIG. 2 to achieve useful power efficiencies in the 100BASE-TX or 1000BASE-T modes, the supply voltage Vcc would have to be chosen around 0.5 volts, which is too low for practical implementations.

One known solution for improving power efficiencies in multimode Ethernet line drivers is to use separate output driver circuitry for the 10BASE-T and 100BASE-TX (or 1000BASE-T) modes, so as to increase output driver voltage swings in the 100BASE-TX (or 1000BASE-T) mode. Although the supply voltage Vcc may remain constant for both Ethernet modes, the 10BASE-T mode may use an output driver circuit having a greater voltage swing than the output driver circuitry for the 100BASE-TX (or 1000BASE-T) mode. As a consequence, the ratio of output driver voltage swing to supply voltage is maintained for the 10BASE-T mode and improved for the 100BASE-TX (or 1000BASE-T) mode.

Figure 3:
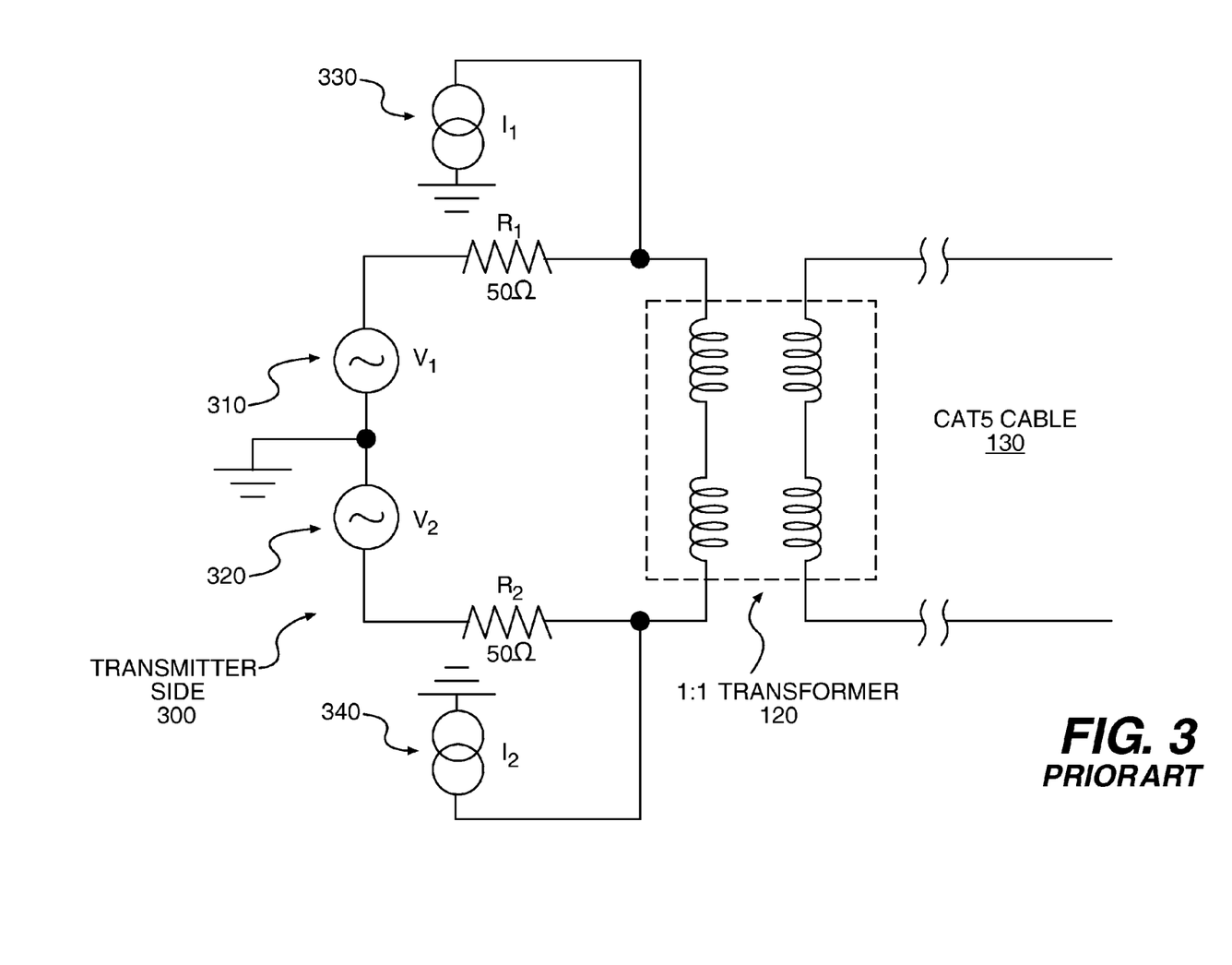
FIG. 3, previously described, is an exemplary prior-art multimode Ethernet line driver circuit having separate output driver circuitry for 10BASE-T and 100BASE-TX signal generation.

FIG. 3 illustrates an example of a multimode Ethernet line driver circuit having separate output driver circuitry for 10BASE-T and 100BASE-TX signal generation. The exemplary transmitter side 300 includes a 100BASE-TX driver circuit comprising a pair of voltage sources 310 and 320 that respectively generate voltages V1 and V2. The line driver of FIG. 3 also includes a pair of 50 ohm termination resistors connected in series with the voltage sources 310 and 320. In the 100BASE-TX mode, the current sources 330 and 340 are "idle" (i.e., not generating currents) and essentially act as open circuits. Because the termination resistors R1 and R2 are series-connected to the voltage sources 310 and 320, the voltage drops across these resistors enables the output voltages V1 and V2 to increase, e.g., around 2 Vpp, while still being able to generate the requisite 1 Vpp output signals at the transformer 120. As a result, the multimode line driver circuit of FIG. 3 requires only a moderate supply voltage, e.g., equal to 2.5 V, to achieve usable power efficiencies in the 100BASE-TX mode.

Despite having certain advantages for 100BASE-TX operations, the multimode line driver circuit of FIG. 3 suffers significant drawbacks in the 10BASE-T mode. In the 10BASE-T mode, the current sources 330 and 340 generate respective currents I1 and I2. The resistors R1 and R2 become termination resistors for the current sources 330 and 340. In addition, the voltage sources 310 and 320 remain powered on and exhibit low impedances, thereby providing an AC ground potential for the 10BASE-T driver circuit. Because the voltage sources essentially function as short circuits to ground, the resulting 10BASE-T line driver circuit of FIG. 3 functions in the same manner as the line driver circuit shown in FIG. 2.

Problems typically arise in the 10BASE-T circuit configuration of FIG. 3 because the voltage sources 310 and 320 are typically implemented using operational amplifiers that are unable to accommodate the fast current-sinking demands required to maintain the AC ground potential during 10BASE-T data transmissions. Moreover, the voltage sources 310 and 320 continue to consume power as they remain active in providing the AC ground potential and, as a result, reduce the power efficiency of the 10BASE-T driver circuit. Such current-sinking and power-consumption limitations of conventional operational amplifiers complicates the design of the voltage sources 310 and 320 and limits their usefulness in prior multimode Ethernet line drivers.

SUMMARY

The present invention overcomes the disadvantages of the prior art by providing a multimode line driver having improved performance. The multimode line driver comprises at least first and second driver circuits that, when "active," respectively transmit data using first and second modes. Only one of the first and second driver circuits may be active at any given time. The multimode line driver comprises a circuit arrangement including a voltage regulator and an associated set of switches. In operation, at least some of the switches are coupled to the second driver circuit and are turned on when the first driver circuit is active. The voltage regulator supplies a direct current ("DC") to at least some of the turned-on switches in order to decrease common mode voltage at the second driver circuit while the first driver circuit transmits data using the first mode. Unlike prior line driver implementations, this regulator/switch arrangement enables components of the second driver circuit to be powered off while the first driver circuit is active, thus reducing power consumption, clipping, and interference with transmissions in the first mode.

In the disclosed embodiments, the first mode may be 10BASE-T Ethernet and the second mode may be either 100BASE-TX ("Fast Ethernet") or 1000BASE-T ("Gigabit Ethernet"). The second driver circuit may comprise at least one voltage source for driving data using the second mode. The voltage regulator may be connected to a center tap of a conventional driver transformer. In such an embodiment, the regulator may be set to a predetermined common mode voltage for data transmissions in the first mode. In the second mode, the voltage regulator also may set the common mode voltage for data transmissions and further provide DC current to at least some of the switches and may additionally provide biasing current to components in the first driver circuit.

Advantageously, the multimode line driver in the disclosed embodiments does not require the second driver circuit to function as an alternating-current ("AC") ground potential when the first driver circuit is active. As such, the novel multimode line driver does not necessarily experience the current-sinking and power-consumption limitations associated with prior implementations. Additional advantages will be set forth in part in the description which follows, and in part will be obvious from the description, or may be learned by practice of the invention. Advantages may be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The drawings, which are incorporated in and constitute a part of this specification, illustrate embodiments of the principles of the present invention and together with the description, serve to explain the principles of the invention. Wherever possible, the same reference numbers will be used throughout the drawings to refer to the same or like parts.

DETAILED DESCRIPTION OF THE EMBODIMENTS

Reference will now be made in detail to the disclosed embodiments consistent with the principles of the invention, examples of which are illustrated in the accompanying drawings. Each of the disclosed embodiments includes an improved multimode Ethernet line driver circuit comprising, inter alia, 10BASE-T driver circuitry and separate driver circuitry for transmitting data using at least one of the 100BASE-TX or 1000BASE-T Ethernet modes. The 10BASE-T driver and the 100BASE-TX/1000BASE-T driver may have some circuit components in common. One of the 10BASE-T and 100BASE-TX/1000BASE-T driver circuits is active at any given time. As discussed in more detail below, the multimode line driver disclosed herein comprises a circuit arrangement including a voltage regulator and an associated set of switches.

In operation, at least some of the switches are coupled to the 100BASE-TX/1000BASE-T driver circuit and are turned on when the 10BASE-T driver circuit is active (i.e., transmitting data). The voltage regulator supplies a DC current to the turned-on switches to lower a common mode voltage at the 100BASE-TX/1000BASE-T driver circuit while the 10BASE-T driver circuit is active. Unlike prior Ethernet driver implementations, this regulator/switch arrangement may enable components of the 100BASE-TX/1000BASE-T driver circuit to be powered off while the 10BASE-T driver circuit is active, thus reducing power consumption in the 10BASE-T Ethernet mode. Further, because the multimode Ethernet line driver in the disclosed embodiments does not require voltage or current sources to remain powered on in the 100BASE-TX or 1000BASE-T driver for the purpose of maintaining an AC ground potential in the 10BASE-T mode, the line driver circuit does not necessarily experience the current-sinking limitations typically associated with prior implementations.

Figure 4:
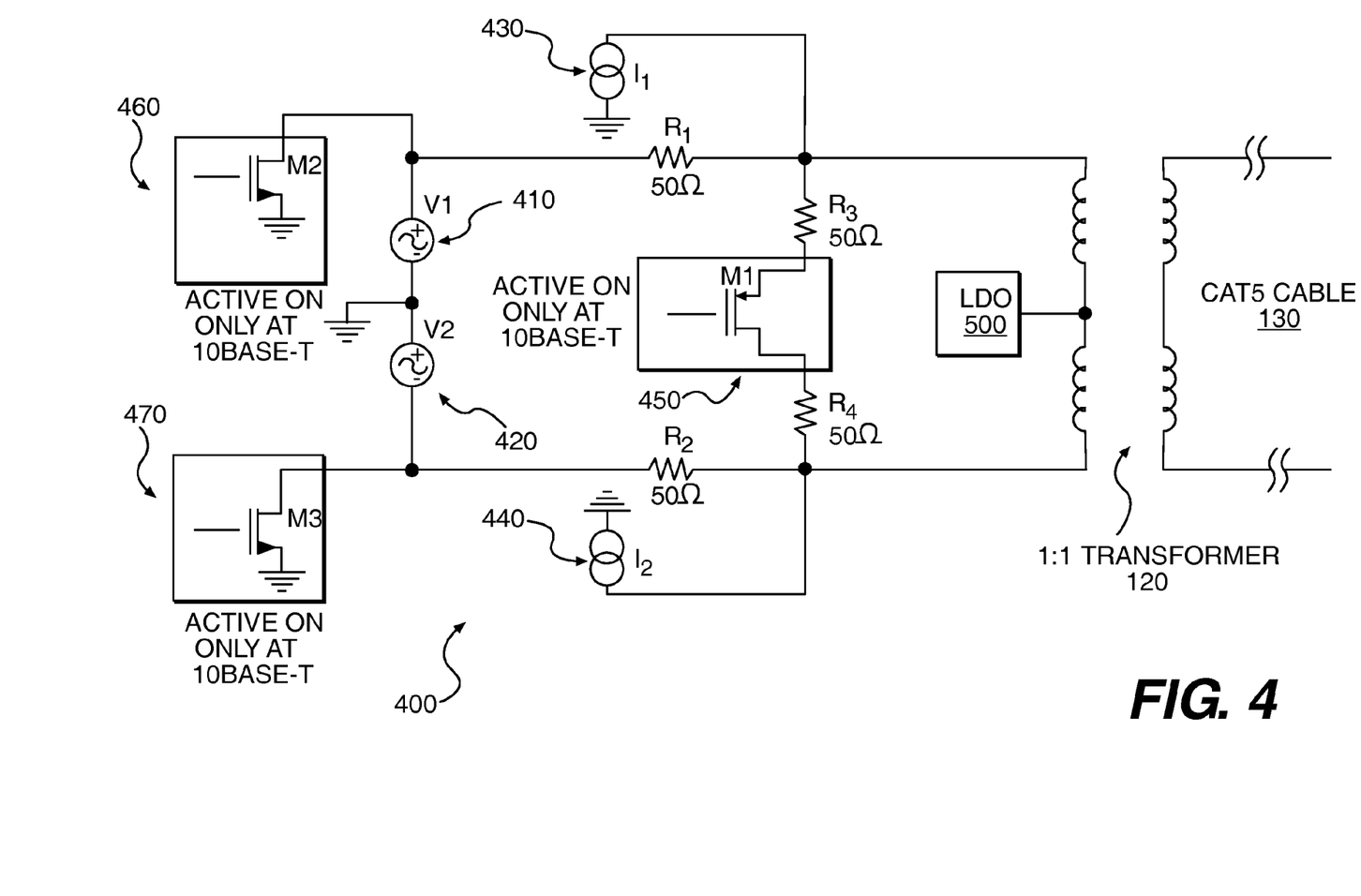
FIG. 4 is a multimode Ethernet line driver circuit in accordance with a first disclosed embodiment consistent with the principles of the present invention.

FIG. 4 illustrates a multimode Ethernet line driver circuit 400 in accordance with a first disclosed embodiment consistent with the principles of the invention. The Ethernet multimode line driver 400 includes separate driver circuitry for 10BASE-T data transmissions and 100BASE-TX or 1000BASE-T transmissions. Current sources 430 and 440 respectively output currents I1 and I2 for generating differential 10BASE-T data signals. A set of voltage sources 410 and 420 respectively output voltages V1 and V2 for generating differential 100BASE-TX and/or 1000BASE-T Ethernet signals. The voltage sources 410 and 420 may be operational-amplifier voltage sources and the current sources 430 and 440 may be conventional n-channel metal-oxide-semiconductor transistor current sources.

With reference to 10BASE-T operations, the current sources 430 and 440 function in concert with switches 450, 460, and 470 and a voltage regulator 500 to effect 10BASE-T data transmissions. The current source 430 may have a first terminal that is electrically connected to ground and a second terminal that is electrically connected to a pair of 50 ohm resistors R1 and R3 and to a first terminal of an Ethernet-driver transformer 120. Similarly, the current source 440 may have a first terminal that is electrically connected to ground and a second terminal that is electrically connected to a pair of 50 ohm resistors R2 and R4 and to a second terminal of the transformer 120. A first switch 450 may be electrically connected between the resistors R3 and R4. A second switch 460 may be electrically connected between the resistor R1 and ground; a third switch 470 may be electrically connected between the resistor R2 and ground.

The switches 450, 460, and 470 may be transistor switches, such as field-effect transistor ("FET") switches M1, M2, and M3 shown in FIG. 4. For example, in FIG. 4 the transistor switch M1 is a p-channel FET and the transistor switches M2 and M3 are n-channel FETs. However, those skilled in the art will appreciate that the exemplary switches 450, 460, and 470 alternatively may be implemented using any mechanical, electro-mechanical, and/or electrical switches known in the art. In the 10BASE-T mode, transistor switches 450, 460, and 470 are turned on and essentially function as electrical short circuits (i.e., low impedance). To that end, the transistor switches M1, M2, and M3 may be turned on by a control signal (or inverted control signal) applied to each of their gate terminals or, alternatively, by separate gate signals, e.g., supplied by a control module (not shown).

A voltage regulator 500 may be connected to a center tap of the transformer 120. Although the voltage regulator 500 may be a low-dropout regulator ("LDO") having a relative low dropout voltage (and thus high power efficiency), the LDO 500 is merely exemplary and other types of voltage regulators alternatively may be used in accordance with the disclosed embodiments. In the 10BASE-T mode, the LDO 500 may be used to set a common mode voltage at the center tap and supply a DC current to the transistor switches M2 and M3. The LDO also may provide other functionality, such as biasing current for at least one of the current sources 430 and 440.

Because the LDO 500 supplies a DC current through resistors R1 and R2, the resulting voltage drops across these resistors lowers the common mode voltage at the 100BASE-TX and 1000BASE-T voltage sources 410 and 420. The lower common mode voltage at the voltage sources 410 and 420 may prevent operational amplifiers in these voltage sources from unintentionally clipping the 10BASE-T data transmissions. Furthermore, because the turned-on switches 460 and 470 electrically short circuit the voltage supplies 410 and 420, these voltage supplies can be powered off in the 10BASE-T mode, thus reducing the circuit's power consumption.

With reference to 100BASE-TX and 1000BASE-T operations, the switches 450, 460, and 470 are turned off and essentially function as electrical open circuits (i.e., high impedances). Accordingly, the voltage regulator/switch arrangement is not used in the 100BASE-TX and 1000BASE-T modes. A negative terminal of the voltage source 410 may be connected to ground and to a positive terminal of the voltage source 420. The positive terminal of the voltage source 410 and the negative terminal of the voltage source 420 may be respectively connected to the 50 ohm termination resistors R1 and R2 which, in turn, are serially connected to opposite ends of the transformer 120. In the 100BASE-TX and 1000BASE-T modes, the voltage regulator 500 may be connected to the center tap of the transformer 120, e.g., to set a common mode voltage for 100BASE-TX and 1000BASE-T data transmissions. However, in the 100BASE-TX and 1000BASE-T modes the voltage regulator 500 is optional and may be powered off or otherwise rendered inactive.

Figure 5:
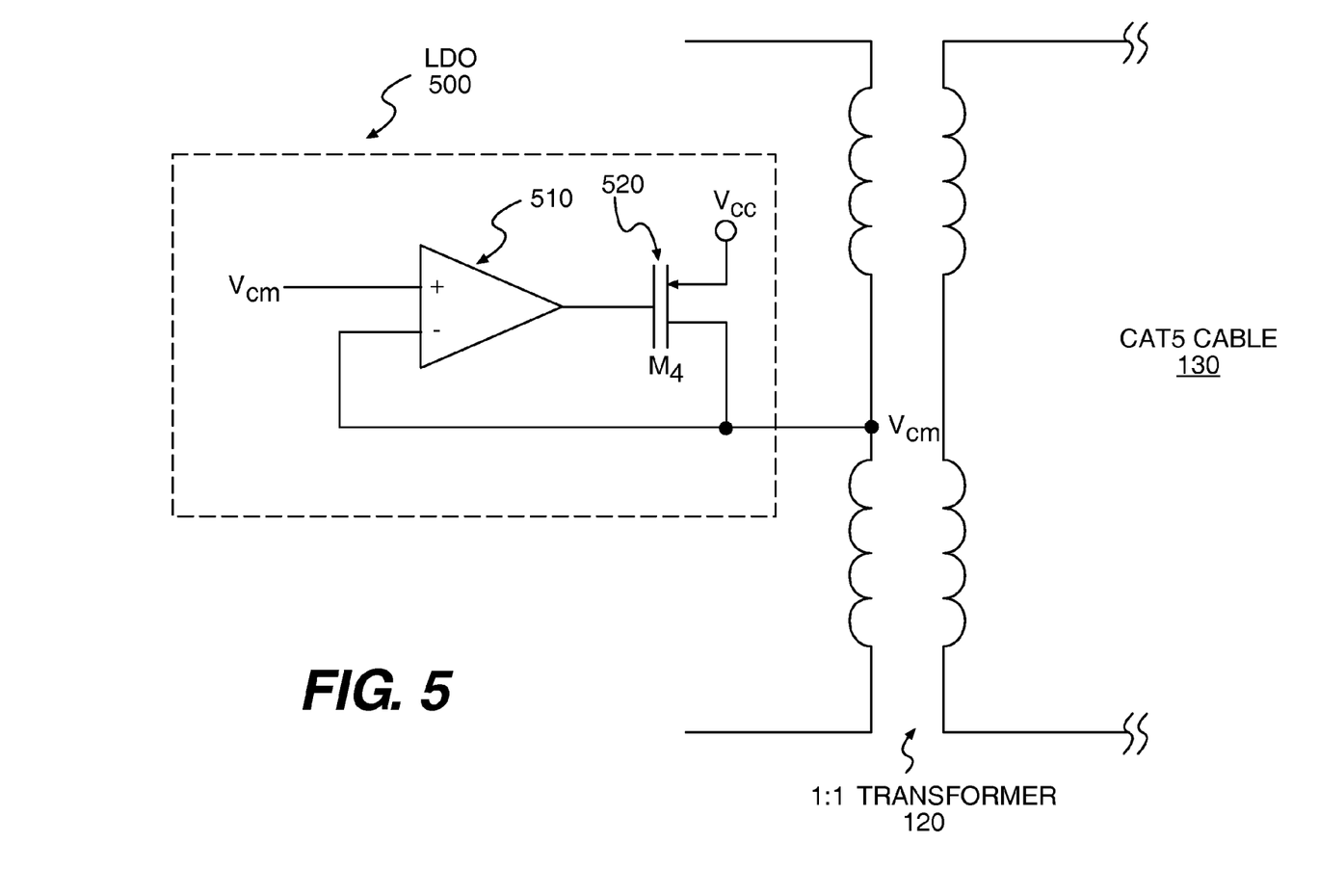
FIG. 5 is an exemplary low dropout voltage regulator that may be used in accordance with the first and second disclosed embodiments.

FIG. 5 illustrates an exemplary LDO 500 that may be used in accordance with the disclosed embodiments. The LDO 500 includes an operational amplifier 510 that receives a predetermined common mode voltage ($V_{CM}$) at its non-inverting input. The predetermined common mode voltage may be a fixed voltage level or may be adjustably selected, e.g., by controlling or manipulating other circuit components (not shown). The inverting input of the operational amplifier 510 may be connected to a center tap of the transformer 120. The output of the operational amplifier 510 may be connected to the gate terminal of a transistor 520 (labeled M4). The drain terminal of the transistor 520 may be connected to a supply voltage VCC, and the source terminal of the transistor may be connected, via a negative feedback connection, to the inverting input of the operational amplifier 510. In this exemplary LDO 500, the transistor 520 is configured to operate as a current source (and not a switch). Although the transistor 520 may be a field-effect transistor, other types of transistors, such as bipolar junction transistors, or other current amplifier or current source circuitry alternatively may be employed.

The circuit configuration of the exemplary LDO 500 enables the common mode voltage ($V_{CM}$) at the non-inverting input of the operational amplifier 510 to be replicated at the center tap of the transformer 120. The transistor 520 may be used as a DC current source for lowering the common mode voltage at the voltage sources V1 and V2 during 10BASE-T operations. The transistor 520 also may provide DC biasing current to one or more of the current sources 430 and 440 in the 10BASE-T mode.

Figure 6:
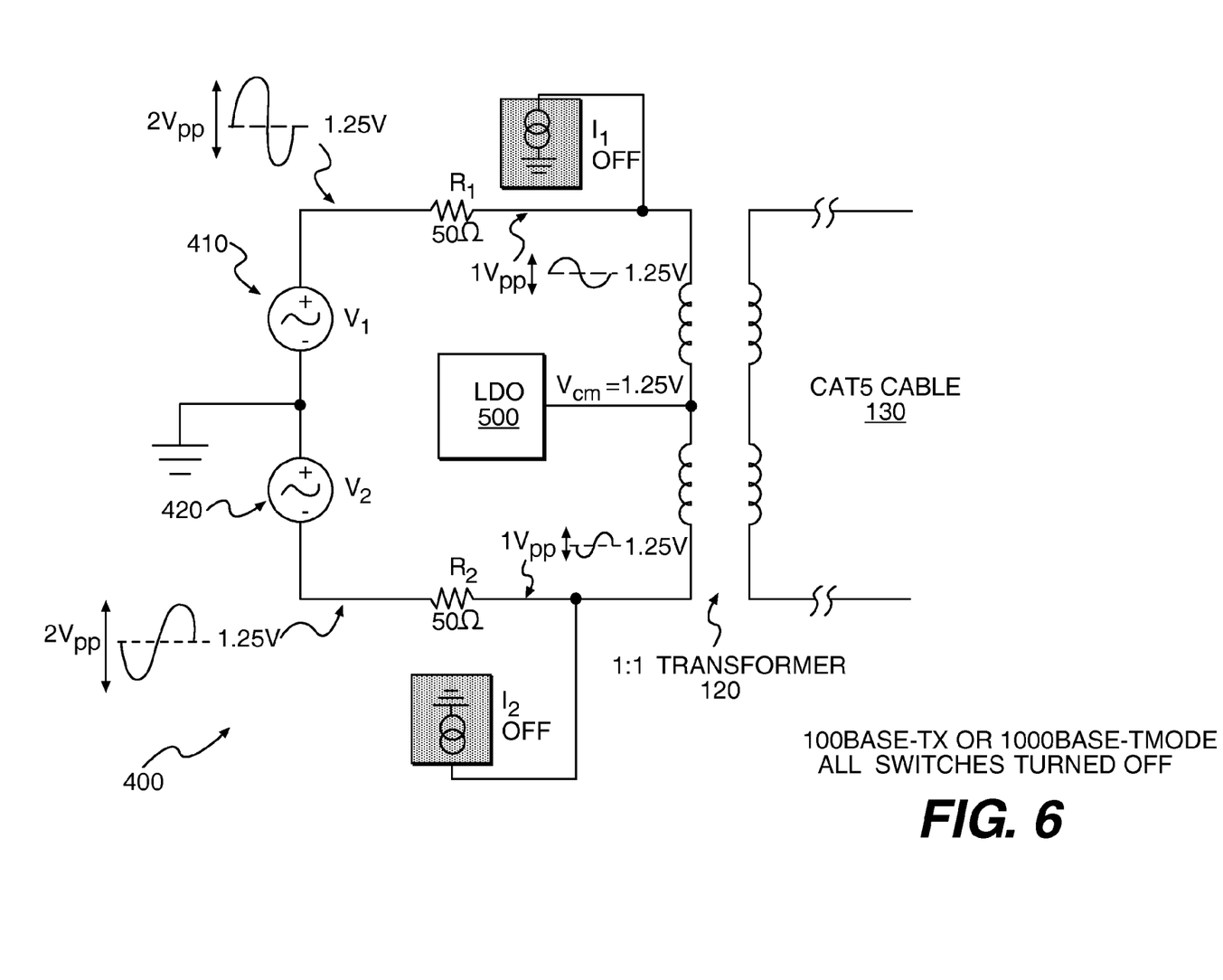
FIG. 6 is an exemplary circuit diagram showing the 100BASE-TX or 1000BASE-T mode in accordance with the first disclosed embodiment.

FIG. 6 illustrates an exemplary circuit diagram showing the 100BASE-TX or 1000BASE-T mode in accordance with the first disclosed embodiment. In this Ethernet mode, the switches 450, 460, and 470 and the current sources 430 and 440 are turned off. As used in the context of the disclosed embodiments, when a switch or current source is turned "off," it exhibits a high impedance, such as an electrical open circuit. Accordingly, FIG. 6 shows the multimode line driver circuit of FIG. 4 after all of the switches and current sources have been turned off. For simplicity, the turned-off switches are not shown in FIG. 6, nor are the non-operative resistors R3 and R4 connected to the turned-off transistor switch 450.

In the 100BASE-TX or 1000BASE-T mode, the LDO 500 may set a 1.25 volt common mode voltage at the center tap of the transformer 120. The voltage sources 410 and 420 generate 2 Vpp data signals having opposite polarities (i.e., 180 degrees out of phase), each signal being centered about the common mode voltage, 1.25 volts. Voltage drops across the resistors R1 and R2 result in lower amplitude, e.g., 1 Vpp, positive and negative output signals (txp, txn) that are received at opposite ends of the transformer 120. The resulting differential Ethernet signal at the transformer 120 is transmitted from the transformer 120 to the Category-5 cable 130.

Figure 7:
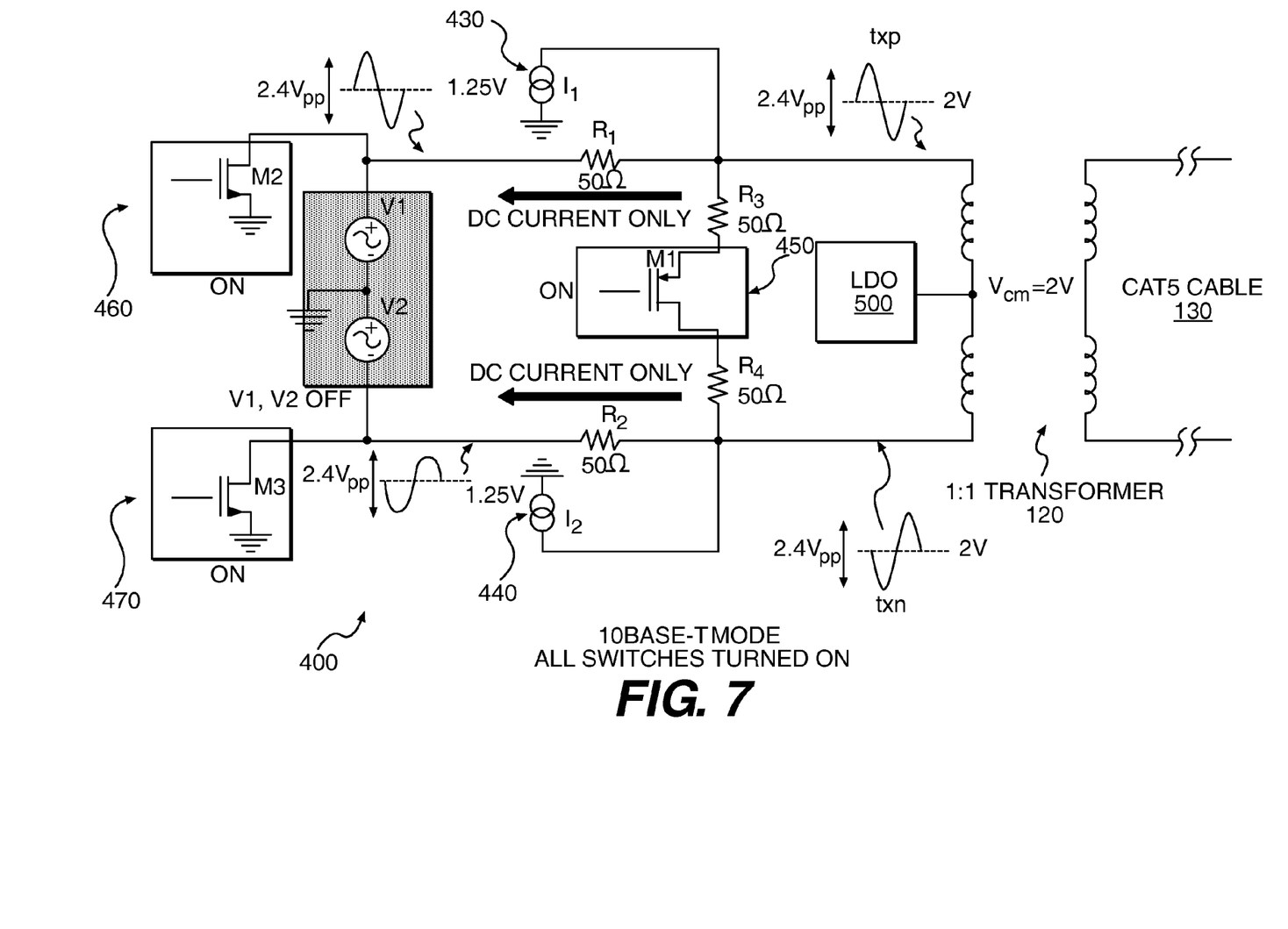
FIG. 7 is an exemplary circuit diagram showing the 10BASE-T mode in accordance with the first disclosed embodiment.

FIG. 7 illustrates an exemplary circuit diagram showing the 10BASE-T mode in accordance with the first disclosed embodiment. In this case, the current sources 430 and 440 are turned on and generate their respective currents I1 and I2. However, the voltage sources 410 and 420 are turned off, preferably powered off, and do not generate voltage signals V1 and V2. When a voltage source is turned "off," it exhibits a high impedance, such as an electrical open circuit. In this exemplary 10BASE-T mode, all of the switches 450, 460 and 470 are turned on and provide low impedance connections, such as electrical shorts circuits.

Further to the 10BASE-T mode of the first disclosed embodiment, the LDO 500 may set a 2 volt common mode voltage at the center tap of the transformer 120. The current sources 430 and 440, in conjunction with the resistors R3 and R4, respectively generate 2.4 Vpp positive and negative output signals (txp, txn) having opposite polarities, each signal being centered about the common mode voltage, 2 volts. The positive and negative output signals may be applied to opposite ends of the transformer 120, and the resulting differential Ethernet signal is transmitted from the transformer to the Category-5 cable 130.

Because the voltage sources 410 and 420 may be implemented using operational amplifiers, the operational amplifiers could unintentionally "clip" (i.e. truncate the amplitude of) the positive and negative output voltages generated by the current sources 430 and 440, if the signal amplitudes at the voltage sources 410 and 420 become too large in the 10BASE-T mode. The regulator/switch circuitry of the first disclosed embodiment may prevent such unintentional clipping by lowering the common mode voltage at the voltage sources 410 and 420. To that end, the LDO 500 supplies DC current that flows through the resistors R1 and R2. The resulting voltage drops across the resistors R1 and R2 effectively lowers the common mode voltage, e.g., from 2 volts to 1.25 volts, at the turned-off voltage sources 410 and 420. More specifically, AC voltages at the voltage sources 410 and 420 follow the 2.4 Vpp positive and negative output signals applied to the transformer 120. However, whereas the common mode voltage (i.e., DC offset voltage) at the transformer is 2 volts, the common mode voltage at the turned-off voltage sources 410 and 420 may be significantly less, e.g., 1.25 volts.

In this exemplary 10BASE-T mode, the voltages sources 410 and 420 can be powered off, so as to reduce the power consumption of the multimode line driver circuit 400. Furthermore, since these voltage sources can be powered off, they do not have to actively sink currents to maintain an AC ground potential, as in prior multimode line driver implementations. As such, the multimode Ethernet line drive circuit 400, e.g., shown in FIGS. 4-7, may not have the same extent of power-consumption and current-sinking limitations typically associated with the prior implementations.

Figure 8:
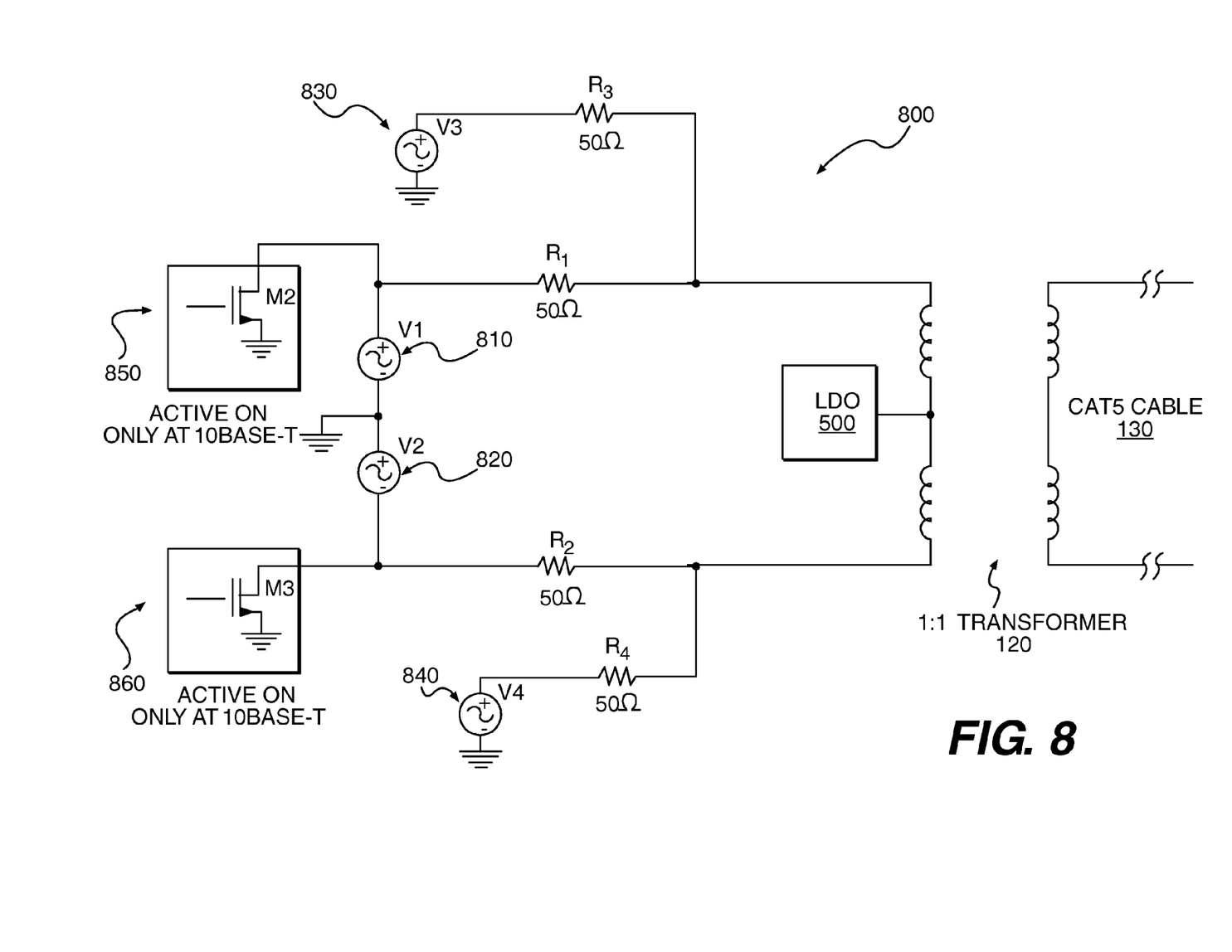
FIG. 8 is a multimode Ethernet line driver circuit in accordance with a second disclosed embodiment consistent with the principles of the present invention.

FIG. 8 illustrates a multimode Ethernet line driver circuit 800. The Ethernet multimode line driver 800 includes separate driver circuitry for 10BASE-T data transmissions and 100BASE-TX or 1000BASE-T transmissions. Specifically, voltage sources 810 and 820 respectively output voltages V1 and V2 for generating differential 100BASE-TX and/or 1000BASE-T data signals. A set of voltage sources 830 and 840 respectively output voltages V3 and V4 for generating differential 10BASE-T Ethernet signals. The voltage sources 810-840 may be operational-amplifier voltage sources.

With reference to 10BASE-T operations, the voltage sources 830 and 840 function in concert with an arrangement of switches 850 and 860 and a voltage regulator 500 to effect 10BASE-T data transmissions. The voltage regulator 500 is preferably the same LDO circuit described with reference to FIG. 5. The voltage source 830 has a negative terminal that may be electrically connected to ground and a positive terminal that may be electrically connected to a 50 ohm resistor R3; the other terminal of resistor R3 may be electrically connected to a first terminal of the transformer 120 and to a 50 ohm resistor R1. The voltage source 840 has a negative terminal that may be electrically connected to ground and a positive terminal that may be electrically connected to a 50 ohm resistor R4; the other terminal of resistor R4 may be electrically connected to a second terminal of the transformer 120 and to a 50 ohm resistor R2. A first switch 850 may be electrically connected between the resistor R1 and ground; a second switch 860 may be electrically connected between the resistor R2 and ground.

The switches 850 and 860 may be transistor switches, such as the field-effect transistors M2 and M3 shown in FIG. 8. For example, in FIG. 8 the transistor switches M2 and M3 are n-channel FETs. However, those skilled in the art will appreciate that the exemplary switches 850 and 860 alternatively may be implemented using any mechanical, electro-mechanical, and/or electrical switches known in the art. In the 10BASE-T mode, the transistor switches 850 and 860 are turned on and essentially function as electrical short circuits (i.e., low impedance). To that end, the transistor switches M2 and M3 may be turned on by a control signal applied to each of their gate terminals or alternatively by separate gate signals, e.g., supplied by a control module (not shown).

The voltage regulator 500 is connected to a center tap of the transformer 120. Although the voltage regulator 500 may be a LDO having a relative low dropout voltage (and thus high power efficiency), the LDO 500 is merely exemplary and other types of voltage regulators alternatively may be used in accordance with the disclosed embodiments. In the 10BASE-T mode of this second disclosed embodiment, the LDO 500 may be used to set a common mode voltage at the center tap and supply a DC current to the transistor switches M2 and M3.

Because the LDO 500 supplies a DC current through resistors R1 and R2, the resulting voltage drops across these resistors lowers the common mode voltage at the 100BASE-TX and 1000BASE-T voltage sources 810 and 820. The lower common mode voltage at the voltage sources 810 and 820 may prevent operational amplifiers in these voltage sources from unintentionally clipping the 10BASE-T data transmissions. Furthermore, because the turned-on transistor switches 850 and 860 electrically short circuit the voltage supplies 810 and 820, these voltage supplies can be powered off in the 10BASE-T mode, thus reducing the circuit's power consumption.

With reference to 100BASE-TX and 1000BASE-T operations, the switches 850 and 860 are turned off and essentially function as electrical open circuits (i.e., high impedances). Accordingly, the voltage regulator/switch arrangement is not used in the 100BASE-TX and 1000BASE-T modes. A negative terminal of the voltage source 810 is connected to ground and to a positive terminal of the voltage source 820. The positive terminal of the voltage source 810 and the negative terminal of the voltage source 820 are respectively connected to the 50 ohm resistors R1 and R2 which, in turn, are serially connected to opposite ends of the transformer 120. In the 100BASE-TX and 1000BASE-T modes, the voltage regulator 500 may be connected to the center tap of the transformer 120, e.g., to set a common mode voltage for 100BASE-TX and 1000BASE-T data transmissions. However, in the 100BASE-TX and 1000BASE-T modes the voltage regulator 500 is optional and may be powered off or otherwise rendered inactive.

Figure 9:
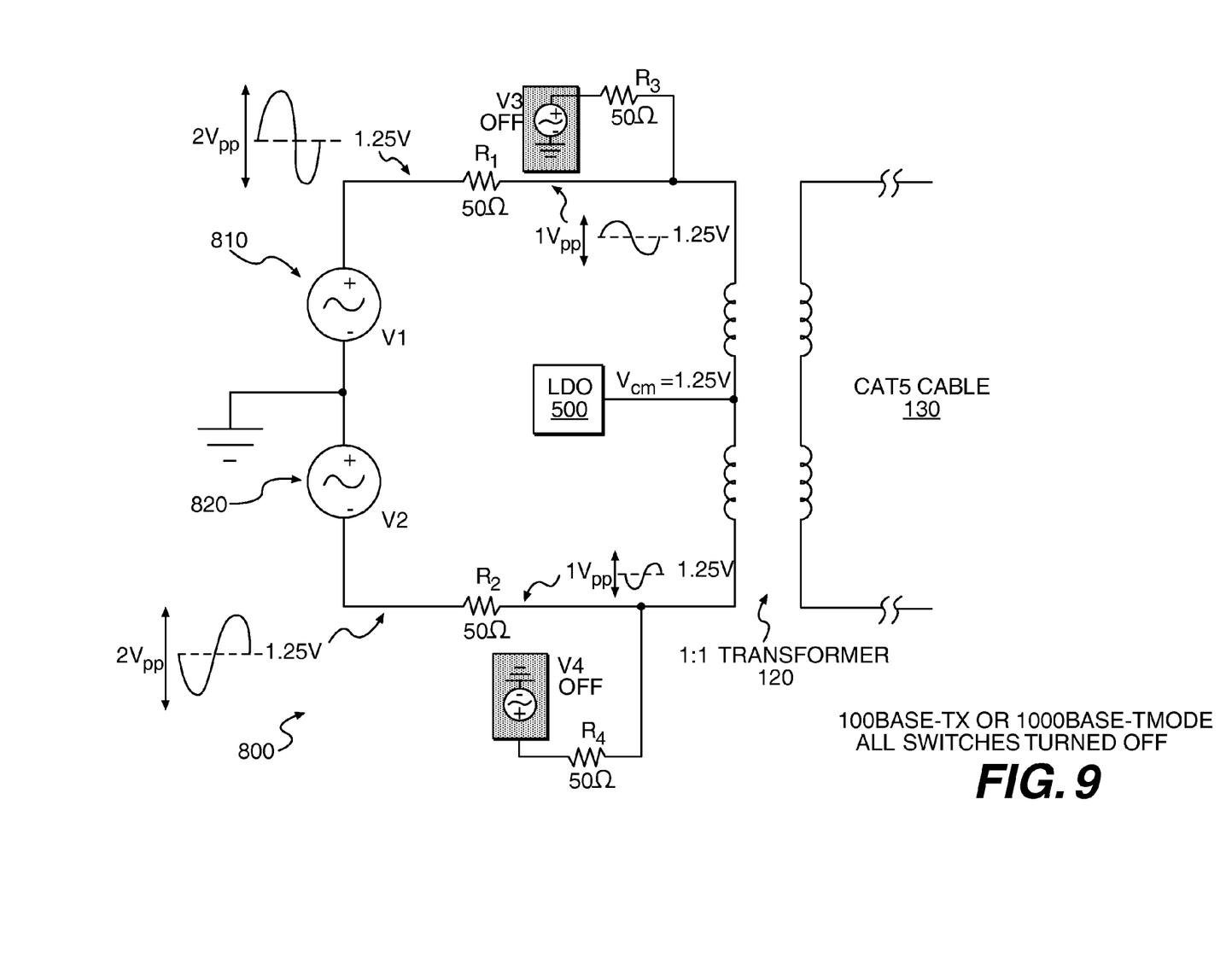
FIG. 9 is an exemplary circuit diagram showing the 100BASE-TX or 1000BASE-T mode in accordance with the second disclosed embodiment.

FIG. 9 illustrates an exemplary circuit diagram showing the 100BASE-TX or 1000BASE-T mode in accordance with the second disclosed embodiment. In this Ethernet mode, the switches 850 and 860 and the voltage sources 830 and 840 are turned off. As used in the context of the disclosed embodiments, when a switch or voltage source is turned "off," it exhibits a high impedance, such as an electrical open circuit. For simplicity, the turned-off switches M2 and M3 are not shown in FIG. 9. In this 100BASE-TX or 1000BASE-T mode, the LDO 500 may set a 1.25 volt common mode voltage at the center tap of the transformer 120. The voltage sources 810 and 820 generate 2 Vpp data signals having opposite polarities (i.e., 180 degrees out of phase), each signal being centered about the common mode voltage, 1.25 volts. Voltage drops across the resistors R1 and R2 result in lower amplitude, e.g., 1 Vpp, positive and negative output signals (txp, txn) that are received at opposite ends of the transformer 120. The resulting differential Ethernet signal at the transformer is transmitted from the transformer 120 to the Category-5 cable 130.

Figure 10:
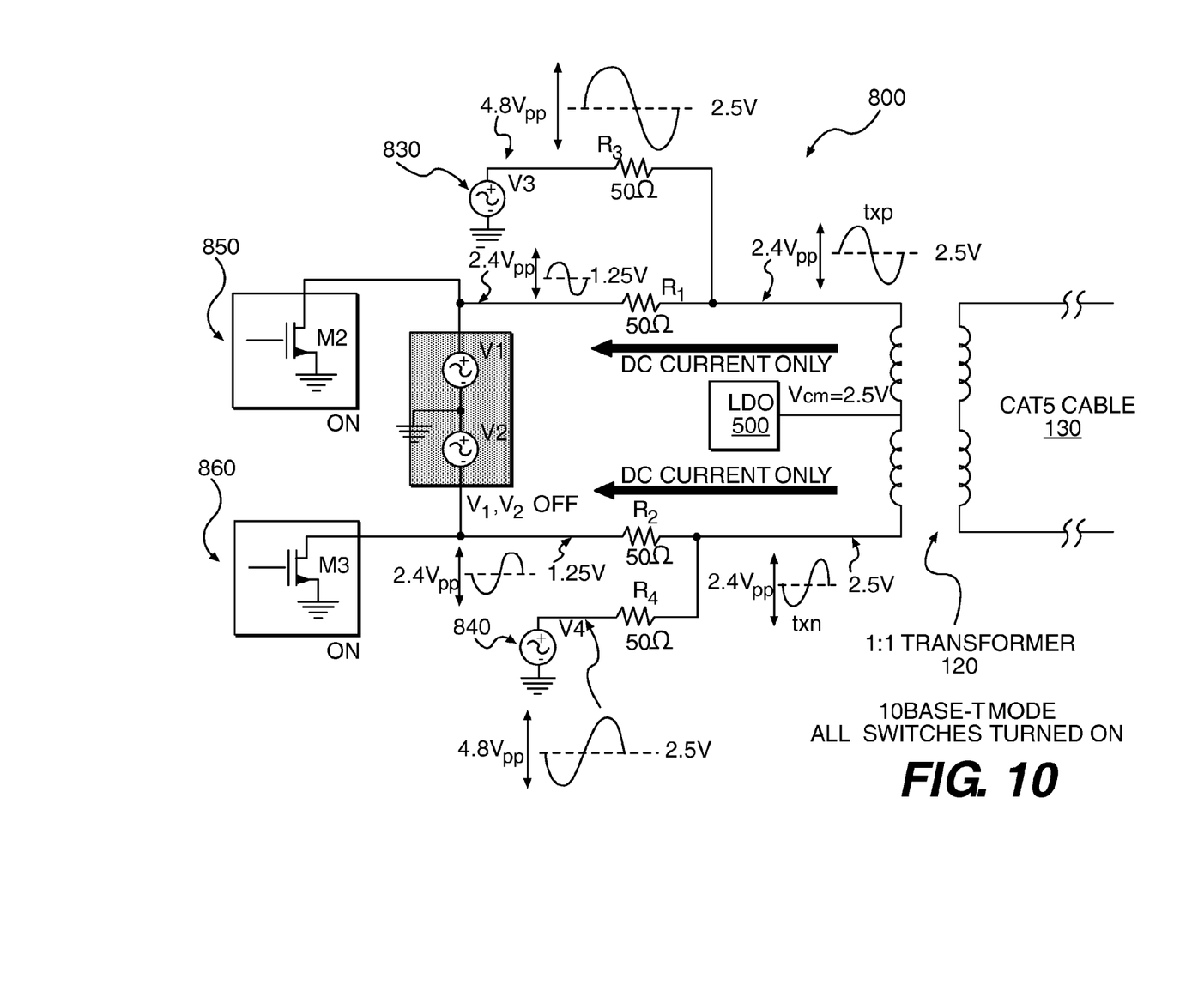
FIG. 10 is an exemplary circuit diagram showing the 10BASE-T mode in accordance with the second disclosed embodiment.

FIG. 10 illustrates an exemplary circuit diagram showing the 10BASE-T mode in accordance with the second disclosed embodiment. In this exemplary 10BASE-T mode, the voltage sources 830 and 840 are turned on and generate their respective voltages V3 and V4. However, the voltage sources 810 and 820 are turned off, preferably powered off, and do not generate their voltage signals V1 and V2. The switches 850 and 860 are turned on and provide low impedance connections, such as electrical shorts circuits.

In this 10BASE-T mode, the LDO 500 may set a 2.5 volt common mode voltage at the center tap of the transformer 120. The voltage sources 830 and 840 respectively generate 4.8 Vpp positive and negative output signals (V3 and V4) having opposite polarities, each signal being centered about the common mode voltage, 2.5 volts. Voltage drops across the resistors R3 and R4 result in the lower amplitude, e.g., 2.4 Vpp, positive and negative output signals (txp, txn) that are received at opposite ends of the transformer 120. The resulting differential Ethernet signal at the transformer is transmitted 120 from the transformer 120 to the Category-5 cable 130.

Because the voltage sources 810 and 820 may be implemented using operational amplifiers, the operational amplifiers could unintentionally clip (i.e. truncate the amplitude of) the positive and negative output voltages generated by the voltage sources 830 and 840, if the signal amplitudes at the voltage sources 810 and 820 become too large in the 10BASE-T mode. The regulator/switch circuitry of the second disclosed embodiment may prevent such unintentional clipping by lowering the common mode voltage at the voltage sources 810 and 820. To that end, the LDO 500 supplies DC current that flows through the resistors R1 and R2. The resulting voltage drops across the resistors R1 and R2 effectively lowers the common mode voltage, e.g., from 2.5 volts to 1.25 volts, at the turned-off voltage sources 810 and 820. More specifically, AC voltages at the voltage sources 810 and 820 follow the 2.4 Vpp positive and negative output signals applied to the transformer 120. However, whereas the common mode voltage (i.e., DC offset voltage) at the transformer is 2.5 volts, the common mode voltage at the turned-off voltage sources 810 and 820 is less, e.g., 1.25 volts.

In the exemplary 10BASE-T mode of the second disclosed embodiment, the voltages sources 810 and 820 can be powered off, so as to reduce the power consumption of the multimode line driver circuit 800. Furthermore, since these voltage sources can be powered off, they do not have to actively sink currents to maintain an AC ground potential, as in prior multimode line driver implementations. As such, the multimode Ethernet line drive circuit 800, e.g., shown in FIGS. 8-10, does not suffer the same extent of power-consumption and current-sinking limitations typically associated with the prior implementations.

The foregoing has been a detailed description of possible embodiments of the invention. Other embodiments of the invention will be apparent to those skilled in the art from consideration of the specification and practice of the invention disclosed herein. For example, although the disclosed embodiments have been described with reference to multimode line driver circuitry for Ethernet modes, those skilled in the art will appreciate that the inventive circuit configurations disclosed herein can be used and/or appropriately modified to transmit multiple modes of network communication protocols other than Ethernet. Further, while the disclosed embodiments implement the 10BASE-T Ethernet mode in combination with at least one of the 100BASE-TX and 1000BASE-T modes, it will be apparent that other combinations of Ethernet modes, e.g., set forth in IEEE Standard 802.3, may be employed in accordance with the disclosed embodiments.

Additionally, various circuit components in the disclosed embodiments can be replaced with their functional equivalents. For example, the exemplary LDO 500 may be replaced with other types of voltage regulation circuits and need not be connected to a center tap of the transformer 120. More generally, a "voltage regulator" in the context of the disclosed embodiments is broadly understood to include any circuit, or combination of hardware and/or software, that provides a common mode voltage and DC current as described herein. Moreover, other types of physical media can be substituted for the exemplary Category-5 cables 130. Thus, the resistance values of the representative 50 ohm termination resistors may be adjusted depending on the physical medium selected. The illustrative one-to-one transformer 120 can also be replaced with an appropriate step-up or step-down transformer, depending on the particular network topology.

Although the disclosed embodiments are implemented in hardware, it is expressly contemplated that at least portions of the invention can be implemented in software, including a computer-readable medium having program instructions executing on a computer, hardware, firmware, or combinations thereof, as will be apparent to those skilled in the art. Accordingly, it is intended that this specification and its disclosed embodiments be considered as exemplary only, with a true scope and spirit of the invention being indicated by the following claims.

What is claimed is:

1. A multimode line driver circuit, comprising:
   a first driver circuit configured to transmit data using a first mode;
   a second driver circuit configured to transmit data using a second mode;
   a plurality of switches coupled to the second driver circuit, the switches being turned on when the first driver circuit transmits data using the first mode and being turned off when the second driver circuit transmits data using the second mode; and
   a voltage regulator configured to supply a direct current to at least some of the turned-on switches in order to decrease a common mode voltage at the second driver circuit when data is transmitted using the first mode.

2. The multimode line driver circuit according to claim 1, wherein the first mode is Ethernet 10BASE-T.

3. The multimode line driver circuit according to claim 1, wherein the second mode is at least one of Ethernet 100BASE-TX and Ethernet 1000BASE-T.

4. The multimode line driver circuit according to claim 1, wherein the second driver circuit comprises at least one voltage source for driving data using the second mode.

5. The multimode line driver circuit according to claim 4, wherein the at least one voltage source is powered off when the first driver circuit transmits data using the first mode.

6. The multimode line driver circuit according to claim 1, wherein the first and second driver circuits utilize at least some of the same circuitry.

7. The multimode line driver circuit according to claim 1, wherein the plurality of switches are transistor switches.

8. The multimode line driver circuit according to claim 1, wherein the voltage regulator is a low dropout voltage regulator.

9. The multimode line driver circuit according to claim 1, wherein the voltage regulator is connected to a center tap of a transformer.

10. The multimode line driver circuit according to claim 9, wherein the voltage regulator sets the center tap to a predetermined common mode voltage.

11. The multimode line driver circuit according to claim 1, wherein the first driver circuit comprises at least one current source.

12. The multimode line driver circuit according to claim 11, wherein the voltage regulator supplies a bias current to the at least one current source.

13. A multimode line driver circuit, comprising:
    means for transmitting data using a first mode;
    means for transmitting data using a second mode;
    a plurality of switches that are turned on when data is transmitted using the first mode and turned off when data is transmitted using the second mode;
    a voltage regulator configured to supply a direct current to at least some of the turned-on switches in order to decrease a common mode voltage when data is transmitted using the first mode.

14. The multimode line driver circuit according to claim 13, wherein the first mode is Ethernet 10BASE-T.

15. The multimode line driver circuit according to claim 13, wherein the second mode is at least one of Ethernet 100BASE-TX and Ethernet 1000BASE-T.

* * * * *